United States Patent
Kottilingam et al.

(10) Patent No.: US 10,227,878 B2
(45) Date of Patent: Mar. 12, 2019

(54) ARTICLE AND METHOD OF FORMING AN ARTICLE

(71) Applicant: GENERAL ELECTRIC COMPANY, Schenectady, NY (US)

(72) Inventors: Srikanth Chandrudu Kottilingam, Simpsonville, SC (US); Yan Cui, Greer, SC (US); Brian Lee Tollison, Honea Path, SC (US); David Edward Schick, Greenville, SC (US)

(73) Assignee: General Electric Company, Schenectady, NY (US)

( * ) Notice: Subject to any disclaimer, the term of this patent is extended or adjusted under 35 U.S.C. 154(b) by 387 days.

(21) Appl. No.: 15/065,968

(22) Filed: Mar. 10, 2016

(65) Prior Publication Data

US 2017/0259462 A1    Sep. 14, 2017

(51) Int. Cl.
  *B29C 33/42*  (2006.01)
  *F01D 5/20*   (2006.01)
  *F01D 5/14*   (2006.01)
  *F01D 5/18*   (2006.01)
  *B29L 31/08*  (2006.01)

(52) U.S. Cl.
  CPC ............... *F01D 5/20* (2013.01); *B29C 33/42* (2013.01); *F01D 5/141* (2013.01); *F01D 5/187* (2013.01); *B29L 2031/08* (2013.01); *F05D 2220/32* (2013.01); *F05D 2230/22* (2013.01); *F05D 2240/307* (2013.01); *F05D 2260/202* (2013.01); *F05D 2260/204* (2013.01)

(58) Field of Classification Search
  CPC . F01D 5/186; F01D 5/187; F01D 5/20; F05D 2240/307; F05D 2260/202; F05D 2260/204; B29C 33/42; B29L 2031/08
  See application file for complete search history.

(56) References Cited

U.S. PATENT DOCUMENTS

| | | | | |
|---|---|---|---|---|
| 4,487,550 A | * | 12/1984 | Horvath | F01D 5/20 416/92 |
| 4,589,823 A | * | 5/1986 | Koffel | F01D 5/20 415/173.4 |
| 8,734,107 B2 | * | 5/2014 | Butkiewicz | F01D 5/147 416/92 |
| 9,015,944 B2 | * | 4/2015 | Lacy | B23P 15/00 29/890.03 |
| 9,297,262 B2 | * | 3/2016 | Zhang | F01D 5/186 |
| 2014/0178207 A1 | * | 6/2014 | He | F01D 5/20 416/96 R |
| 2016/0265366 A1 | * | 9/2016 | Snyder | F01D 5/187 |

* cited by examiner

*Primary Examiner* — Ninh H. Nguyen

(57) ABSTRACT

An article and method of forming an article are provided. The article includes a side wall at least partially defining an inner region and an outer region of the article, the side wall having a first end and a second end, an end wall formed proximal to the first end of the side wall, the end wall defining a tip portion of the article, and a cooling channel formed in the side wall, within the tip portion. The method of forming an article includes positioning a first sheet of material having a channel formed therein over a first end of a body, positioning at least one additional sheet of material over the first sheet of material, and securing the first sheet of material and the at least one additional sheet of material to the body to form a tip portion including a cooling channel formed therein.

12 Claims, 4 Drawing Sheets

ARTICLE AND METHOD OF FORMING AN ARTICLE

FIELD OF THE INVENTION

The present embodiments are directed to an article and a method of forming an article. More particularly, the present embodiments are directed to a cooled article and a method of forming a cooled article.

BACKGROUND OF THE INVENTION

Turbine systems are continuously being modified to increase efficiency and decrease cost. One method for increasing the efficiency of a turbine system includes increasing the operating temperature of the turbine system. To increase the temperature, the turbine system must be constructed of materials which can withstand such temperatures during continued use.

In addition to modifying component materials and coatings, one common method of increasing temperature capability of a turbine component includes the use of cooling channels. Cooling channels are often formed in metals and alloys used in high temperature regions of gas turbines. Typically, these cooling channels are formed through drilling, such as with a laser or waterjet, or electrical discharge machining. However, forming complex cooling channels may be difficult using drilling or electrical discharge machining. Additionally, cooling channels formed through these methods are usually limited to holes extending directly through a wall of the component. While these holes formed directly through the wall provide fluid flow between an inner region and an outer region of the component, they generally do not provide fluid circulation within the walls of the component.

Due to difficulty associated with forming complex cooling channels and the lack of fluid circulation within the walls of the component, various portions of the components, such as the tip portion of a turbine bucket, do not currently include internal cooling channels. Instead, these portions rely on film and/or conductive cooling from cooling channels formed in other portions of the component.

BRIEF DESCRIPTION OF THE INVENTION

In an embodiment, an article includes a side wall at least partially defining an inner region and an outer region of the article, the side wall having a first end and a second end, an end wall formed proximal to the first end of the side wall, the end wall defining a tip portion of the article, and a cooling channel formed in the side wall, within the tip portion.

In another embodiment, a method of forming an article includes forming a first sheet of material, the first sheet of material having a channel formed therein, forming at least one additional sheet of material, positioning the first sheet of material over a first end of a body, positioning the at least one additional sheet of material over the first sheet of material, and securing the first sheet of material and the at least one additional sheet of material to the first end of the body to form a tip portion of the article, the channel in the first sheet forming a cooling channel within the tip portion.

In another embodiment, a method of forming an article includes forming a first pre-sintered preform (PSP) sheet, the first PSP sheet having a channel formed therein and extending completely therethrough, forming at least one additional PSP sheet, positioning the first PSP sheet over a first end of a body, positioning the at least one additional PSP sheet over the first PSP sheet, and securing the first PSP sheet and the at least one additional PSP sheet to the first end of the body to form a tip portion of the article, the channel in the first PSP sheet forming a cooling channel within the tip portion. The body forms a fluid tight bottom of the cooling channel and the at least one additional sheet of material forms a fluid tight top of the cooling channel.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are an article and method of cooling an article. Embodiments of the present disclosure, for example, in comparison to concepts failing to include one or more of the features disclosed herein, increase cooling efficiency, increase tip cooling effectiveness, facilitate increased control of cooling flow distribution, increase downstream tip cooling, increase article life, facilitate use of increased system temperatures, increase system efficiency, provide increased control over film supply pressure, or a combination thereof.

Figure 1:
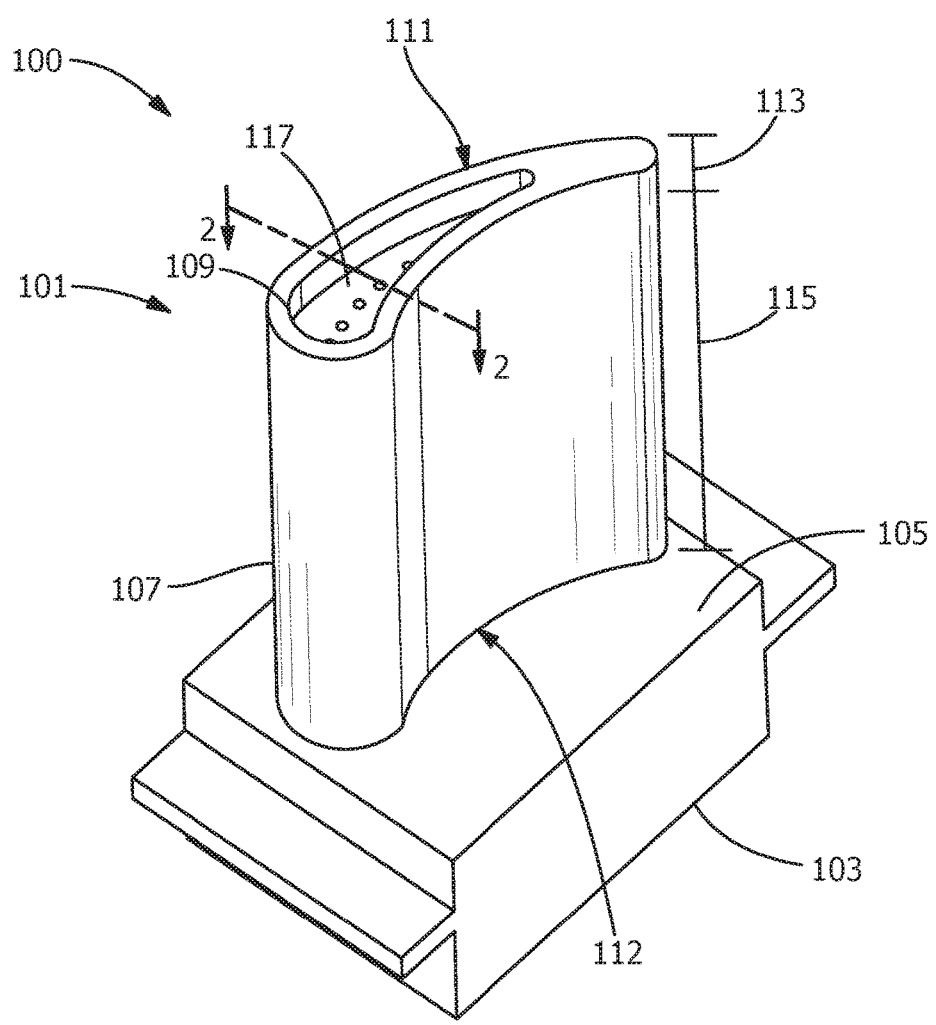
FIG. 1 is a perspective view of an article, according to an embodiment of the disclosure.

Referring to FIG. 1, in one embodiment, an article 100 includes, but is not limited to, a turbine bucket 101 or blade. The turbine bucket 101 has a root portion 103, a platform 105, and an airfoil portion 107. The root portion 103 is configured to secure the turbine bucket 101 within a turbine system, such as, for example, to a rotor wheel. Additionally, the root portion 103 is configured to receive a fluid from the turbine system and direct the fluid into the airfoil portion 107. Although described herein with regard to a turbine bucket, as will be appreciated by those skilled in the art, the article 100 is not so limited and may include any other article suitable for receiving a cooling fluid, such as, for example, a hollow component, a hot gas path component, a shroud, a nozzle, a vane, or a combination thereof.

The airfoil portion 107 of the turbine bucket 101 includes a side wall 109 having a first end 111 and a second end 112. The first end 111 is a distal end of the airfoil portion 107 extending away from the platform 105, and the second end 112 is a proximal end of the airfoil portion 107 attached to the platform 105. In one embodiment, the first end 111 includes a tip portion 113 that extends from a body 115 of the article 100. In another embodiment, the tip portion 113 is defined by any section of the article 100 extending past an end wall 117 formed proximal to the first end 111. For example, in a further embodiment, the tip portion 113 includes a portion of the side wall 109 and/or any other material secured to the side wall 109 that extends past the end wall 117.

Figure 2:
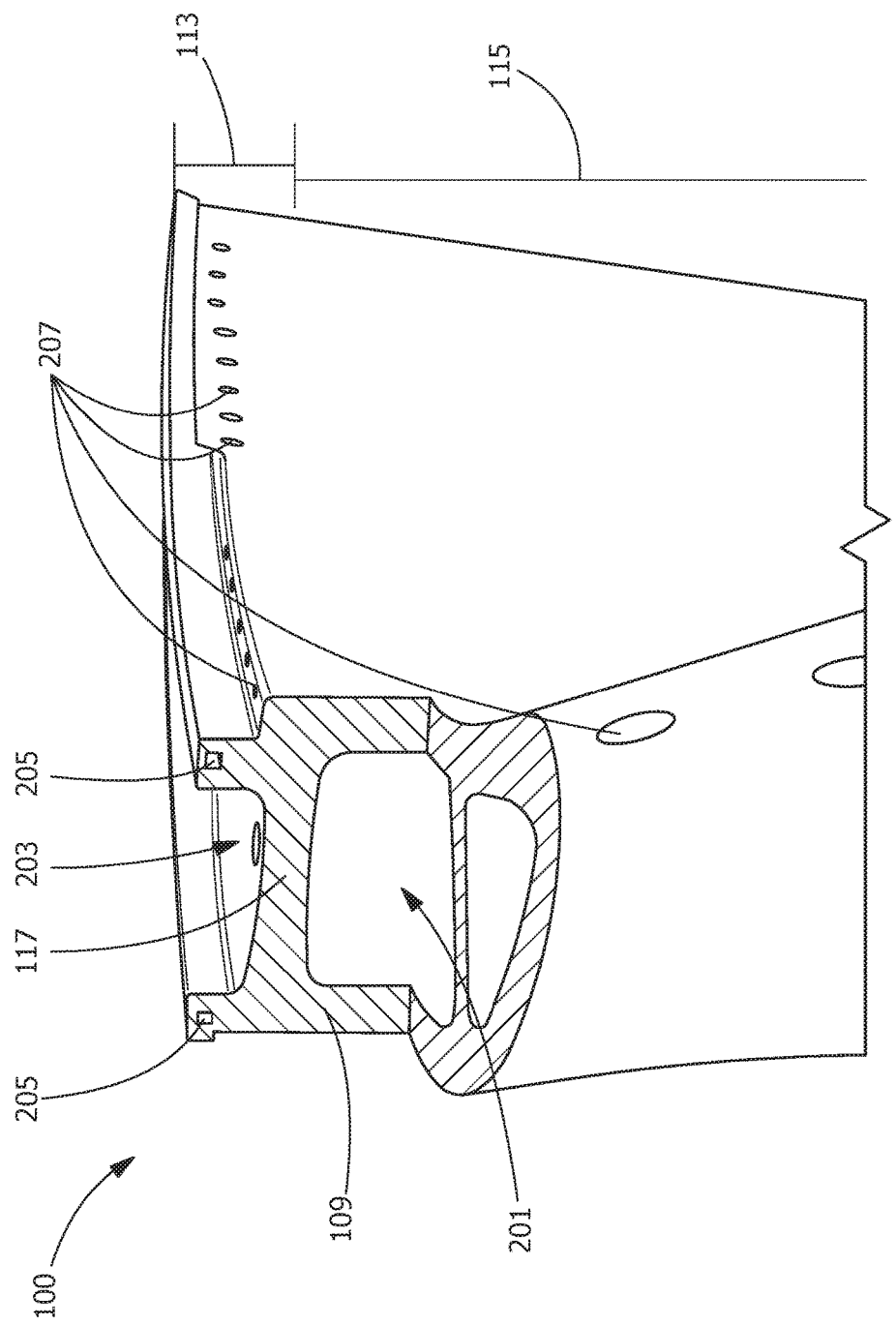
FIG. 2 is a section view of the article of FIG. 1, taken along the line 2-2, according to an embodiment of the disclosure.
Figure 3:
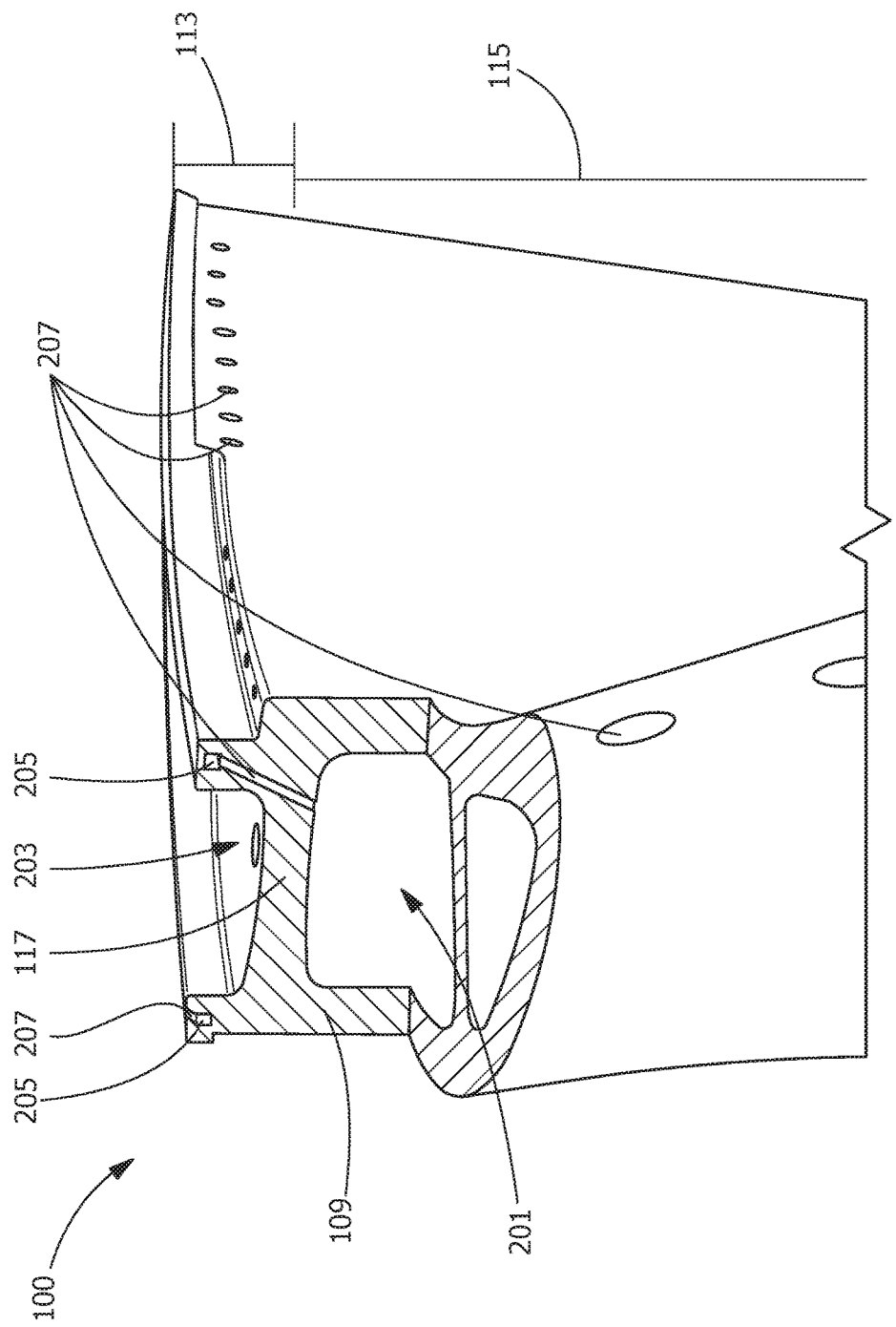
FIG. 3 is a section view of the article of FIG. 1, taken along the line 2-2, according to another embodiment of the disclosure.

In one embodiment, as illustrated in FIG. 2, a cooling channel 205 is formed in the tip portion 113. The cooling channel 205 extends parallel or substantially parallel to the end wall 117. As used herein, the term "substantially parallel" refers to the cooling channel 205 extending in a plane that is within 10 degrees of parallel to the end wall 117. In another embodiment, in contrast to other cooling channels 207 that extend between an inner region 201 and an outer region 203 defined by the side wall 109 and/or the end wall 117, the cooling channel 205 extends circumferentially around the tip portion 113, within the side wall 109. Referring to FIG. 3, in a further embodiment, the cooling channel 205 is in fluid communication with at least one of the other cooling channels 207, providing fluid communication between the cooling channel 205 and the inner region 201 and/or the outer region 203.

The cooling channel 205 within the side wall 109 of the tip portion 113 provides cooling of the tip portion 113 during use of the article 100. As compared to other methods of cooling the tip portion 113, the cooling provided by the cooling channel 205 increases cooling efficiency, increases system efficiency, increases article life, increases sealing of the tip portion 113, decreases oxidation of the tip portion 113, decreases erosion of the tip portion 113, and/or decreases overcooling of portions adjacent the tip portion 113. For example, cooling fluid within the cooling channel 205 provides increased cooling of the tip portion 113 as compared to conductive cooling of the tip portion 113 through the other cooling channels 207 positioned outside the tip portion 113. Additionally, the direct cooling of the tip portion 113 with the cooling channel 205 permits decreased conductive cooling of the tip portion 113 through the other cooling channels 207, which decreases or eliminates overcooling of portions surrounding the other cooling channels 207.

Figure 4:
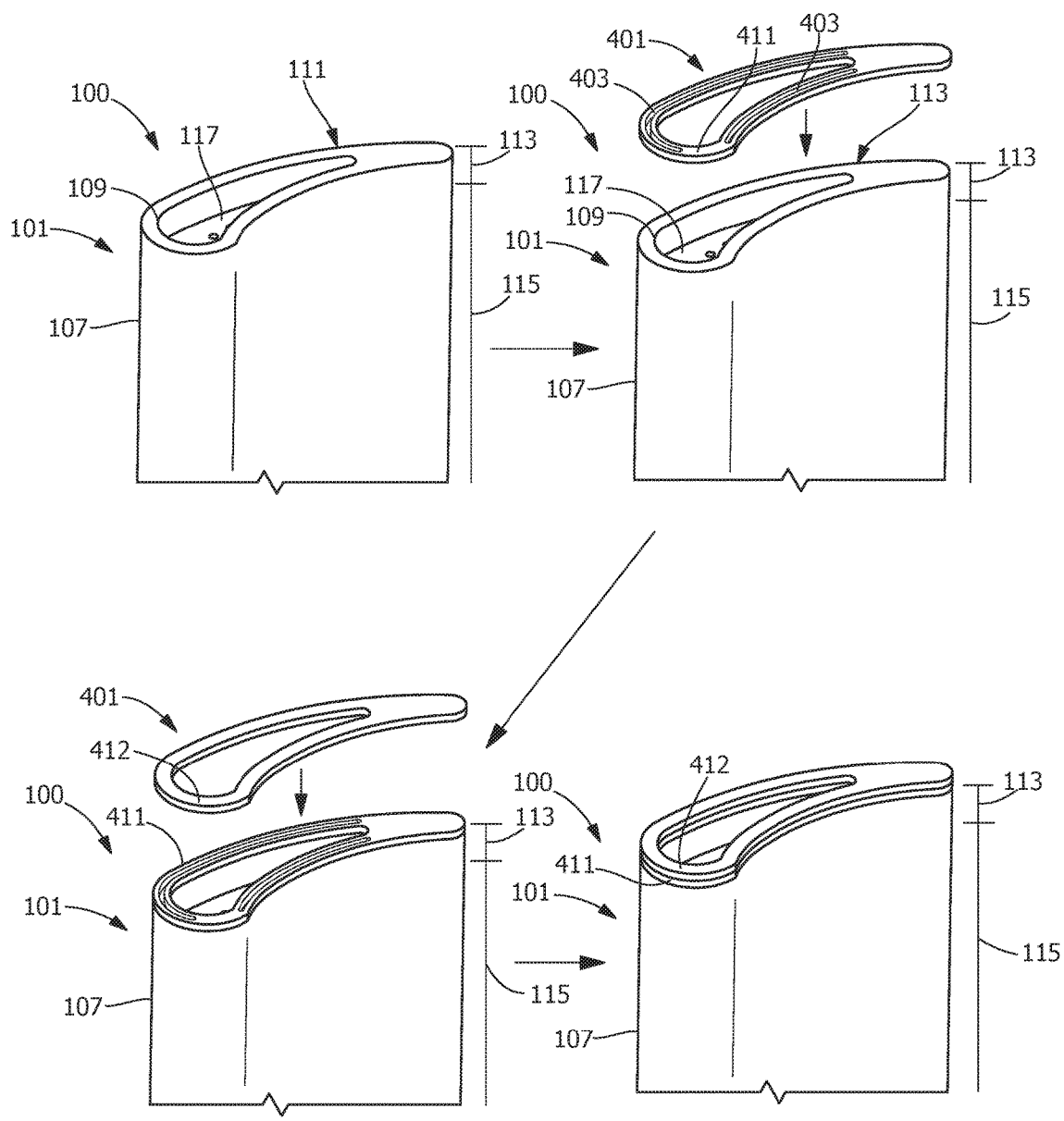
FIG. 4 is a process view of a method of forming an article, according to an embodiment of the disclosure.

The cooling channel 205 is formed in the tip portion 113 through any suitable method. For example, in one embodiment, as illustrated in FIG. 4, forming the cooling channel 205 includes securing one or more sheets 401 to the first end 111 of the side wall 109. In another embodiment, the one or more sheets 401 include an inner sheet 411 and an outer sheet 412. The inner sheet 411 is positioned on and/or over the first end 111 of the side wall 109, and the outer sheet 412 is positioned on and/or over the inner sheet 411. Additionally or alternatively, another outer sheet 412 may be positioned between the first end 111 and the inner sheet 411, such that the inner sheet 411 is bookended by the outer sheets 412. After positioning the inner sheet 411 and/or the outer sheet(s) 412, the sheets 401 are secured to the first end 111 of the side wall 109 to extend the tip portion 113. Additionally or alternative, an optional coating, such as a bond coat and a thermal barrier coating, may then be applied over the inner sheet 411 and/or the outer sheet(s) 412 secured to the first end 111.

In one embodiment, during the securing of the sheets 401, at least one slot 403 extending through the inner sheet 411, from a top surface to a bottom surface thereof, is enclosed by the first end 111 of the side wall 109 and/or the outer sheet(s) 412, the enclosed slot(s) forming the cooling channel(s) 205. In another embodiment, the side wall 109 and/or the outer sheet 412 includes one or more other cooling channels 207 in fluid communication with the cooling channel 205 formed by the slot 403, the one or more cooling channels 207 providing an inlet to the inner region 201 and/or an outlet to the outer region 203, as shown in FIG. 3. As used herein, the terms "top surface" and "bottom surface" are used with reference to the first end 111 of the side wall 109, with the "bottom surface" including a surface facing the first end 111, and the "top surface" including a surface facing in a direction substantially opposite that of the bottom surface (e.g., away from the first end 111). For example, the surface of the inner sheet 411 that is positioned on and/or over the first end 111 forms the bottom surface, while the opposite surface, which is adjacent to and/or in contact with the outer sheet 412, forms the top surface.

The cooling channel 205 formed from the slot 403 extending through the inner sheet 411 includes any suitable shape and/or geometry based upon the contours of the slot 403, the first end 111 of the side wall 109, and/or the surface of the outer sheet(s) 412 that is secured to the inner sheet 411. For example, the cooling channel 205 formed from the slot 403 having substantially flat, parallel walls, a substantially flat surface of the first end of the side wall 109, and a substantially flat surface of the outer sheet 412 will include a substantially square and/or rectangular shape and/or geometry. Alternatively, the cooling channel 205 formed from the slot 403 having curved walls, a curved surface of the first end of the side wall 109, and a curved surface of the outer sheet 412 will include a substantially circular and/or oval shape and/or geometry. As will be appreciated by those skilled in the art, the shape and/or geometry of the cooling channel 205 is not limited to the examples above and may include any other suitable shape and/or geometry, such as, but not limited to, triangular, rounded, trapezoidal, irregular, and/or any other suitable geometric shape. Additionally, the shape and/or geometry of the cooling channel 205 may vary along the length thereof.

In certain embodiments, the one or more sheets 401 may include multiple inner sheets 411 and/or multiple outer sheets 412. In one embodiment, each of the inner sheets 411 includes the at least one slot 403 extending therethrough. The at least one slot 403 in each of the inner sheets 411 is arranged and disposed to align with the at least one slot 403 in the other inner sheet(s) 411, the aligned slots 403 forming a continuous channel extending through the multiple inner sheets 411 with any suitable dimension of the cooling channel 205. The channel may have any cross sectional shape, including, but not limited to, a square, a rectangle, or a U-shape. In another embodiment, the multiple outer sheets 412 may be stacked over the inner sheet(s) 411 and/or between the first end 111 of the side wall 109 and the inner sheet(s) 411 to provide any suitable dimension of the tip portion 113. In some embodiments, the thickness of the tip portion is in the range of about 0.38 mm to about 1.52 mm (about 0.015 to about 0.060 inches), alternatively in the range of about 0.64 mm to about 1.27 mm (about 0.025 to about 0.050 inches), alternatively in the range of about 0.89 mm to about 1.02 mm (about 0.035 to about 0.040 inches), or any range or sub-range therebetween.

In an alternate embodiment, the cooling channel 205 is formed without the inner sheet 411. For example, forming the cooling channel 205 without the inner sheet 411 may include forming one or more grooves in the outer sheet 412, the one or more grooves extending partially into the outer sheet 412 without extending completely therethrough, and then securing the outer sheet 412 to the first end 111 of the side wall 109. Upon securing the outer sheet 412 to the first end 111 of the side wall 109, the one or more grooves therein form the cooling channel(s) 205. Additionally or alternatively, two outer sheets 412 may be secured to the first end 111, with the top surface of one outer sheet 412 having one or more grooves which are arranged and disposed to align with one or more grooves in the bottom surface of the other outer sheet 412. After securing the two outer sheets 412 to the first end 111 of the side wall 109, the aligned grooves in the two outer sheets 412 form the cooling channel(s) 205 in the tip portion 113.

The inner sheet 411 and the outer sheet 412 include any suitable material, which may be the same, substantially the same, or different, and are secured to the first end 111 of the side wall 109 through any suitable method. Suitable materials include, but are not limited to, braze materials, braze pastes, pre-sintered preforms (PSPs), any other material suitable for joining with the article 100, or a combination thereof. Suitable methods for securing the inner sheet 411 and/or the outer sheet 412 include, but are not limited to, brazing, vacuum brazing, sintering, welding, any other method suitable for securing the material of the inner sheet 411 and/or the outer sheet 412 to the material of the article 100, or a combination thereof.

In some embodiments, the tip piece is brazed to the blade tip via braze foil or braze paste. In embodiments where the inner sheet 411 or the outer sheet 412 is a PSP, the PSP may be used as single layer/multiple layer, single piece/multiple piece. The top-most layer may be PSP, a superalloy material, or a ceramic matrix composite (CMC).

The PSP preferably contains at least two materials with various mixing percentages. A first material may include, for example, any material suitable for the hot-gas path of a turbine system. A second material may include, for example, a braze alloy, such as, but not limited to, a nickel braze alloy material having a composition, by weight, of between about 13% and about 15% chromium (Cr), between about 9% and about 11% cobalt (Co), between about 2.25% and about 2.75% tantalum (Ta), between about 3.25% and about 3.75% aluminum (Al), between about 2.5% and about 3% boron (B), up to about 0.1% yttrium (Y) (for example, between about 0.02% and about 0.1% Y), and a balance of nickel (Ni); or between about 18.5% and about 19.5% Cr, between about 9.5% and about 10.5% silicon (Si), about 0.1% Co, about 0.03% B, about 0.06% carbon (C), and a balance of Ni.

In some embodiments, the first material is a high melt powder and the second material is a low melt powder. The PSP is therefore a mixture of a high melt powder and a low melt powder sintered to make the PSP rigid. The ratio of high melt powder to low melt powder is preferably in the range of 75:25 to 30:70, alternatively in the range of 65:35 to 40:60, alternatively 55:45 to 50:50, or ranges or subranges therebetween.

In some embodiments, the high melt powder is a composition, by weight, including, but not limited to, about 9.3% to about 9.7% tungsten (W), about 9.0% to about 9.5% Co, about 8.0% to about 8.5% Cr, about 5.4% to about 5.7% Al, up to about 0.25% Si, up to about 0.1% manganese (Mn), about 0.06% to about 0.09% C, incidental impurities, and a balance of Ni (e.g., Mar-M-247); about 8.4% Cr, about 9.5% Co, about 5.5% Al, about 0.7% titanium (Ti), about 9.5% W, about 0.5% molybdenum (Mo), about 3% Ta, about 1.5% hafnium (Hf), and a balance of Ni (e.g., René 108); about 6.8% Cr, about 12% Co, about 6.1% Al, about 4.9% W, about 1.5% Mo, about 2.8% rhenium (Re), about 6.4% Ta, about 1.5% Hf, and a balance of Ni (e.g., Rene 142); about 7.6% Cr, about 3.1% Co, about 7.8% Al, about 5.5% Ta, about 0.1% Mo, about 3.9% W, about 1.7% Re, about 0.15% Hf, and a balance of Ni (e.g., René 195); or about 7.5% Co, about 13% Cr, about 6.6% Al, about 5% Ta, about 3.8% W, about 1.6% Re, about 0.15% Hf, and a balance of Ni (e.g., René N2).

In some embodiments, the low melt powder is a composition, by weight, including, but not limited to, about 71% Ni, about 19% Cr, and about 10% Si (e.g., AMS4782); about 82.4% Ni, about 7% Cr, about 4.5% Si, about 3.1% B, and about 3% iron (Fe) (e.g., AMS4777); about 14.0% Cr, about 10.0% Co, about 3.5% Al, about 2.7% B, about 0.02% Y, and a balance of Ni (e.g., DF4B); between about 13% and about 15% Cr, between about 9% and about 11% Co, between about 3.2% and about 3.8% Al, between about 2.2% and about 2.8% Ta, between about 2.5% and about 3.0% B, up to about 0.10% Y (optionally present), and a balance of Ni; between about 14% and about 16% Co, between about 19% and about 21% Cr, between about 4.6% and about 5.4% Al, a maximum of about 0.02% B, a maximum of about 0.05% C, between about 7.5% and about 8.1% Si, a maximum of about 0.05% Fe, and a balance of Ni; or about 15.3% Cr, about 10.3% Co, about 3.5% Ta, about 3.5% Al, about 2.3% B, and a balance of Ni.

For example, in one embodiment, the inner sheet 411 and the outer sheet 412 include PSPs. In another embodiment, the PSPs are positioned over the first end 111 of the side wall 109 and then vacuum brazed to the article 100. In a further embodiment, a portion of the first end 111, the inner sheet 411, and/or the outer sheet 412 includes any suitable coating material deposited thereon, the coating material being arranged and disposed to form an internal coating within the cooling channel 205 formed by the vacuum brazing of the PSPs. Suitable coating materials include, but are not limited to, aluminide coatings, thermally conductive coatings, corrosion resistant coatings, or a combination thereof. As will be appreciated by those skilled in the art, the application of the coating material is not limited to PSPs and may be deposited over a portion of any suitable material used to form the side wall 109, the inner sheet 411, and/or the outer sheet 412.

Any of the alloy compositions described herein may include incidental impurities.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of forming an article, the method comprising:
    forming a first sheet of material, the first sheet of material having a channel formed therein;
    forming at least one additional sheet of material, wherein the at least one additional sheet of material comprises at least one sheet of material that is devoid of a channel formed therein;
    positioning the first sheet of material over a first end of a body;
    positioning the at least one additional sheet of material over the first sheet of material; and securing the first sheet of material and the at least one additional sheet of material to the first end of the body to form a tip portion of the article, the channel in the first sheet forming a cooling channel within the tip portion.

2. The method of claim 1, wherein the first sheet of material is a pre-sintered preform.

3. The method of claim 1, wherein the at least one additional sheet of material is a pre-sintered preform.

4. The method of claim 1, wherein the at least one additional sheet of material comprises at least one sheet of material having a channel formed therein.

5. The method of claim 4, wherein, during the positioning of the at least one additional sheet of material, the channel in the at least one additional sheet of material is aligned with the channel in the first sheet of material, the aligned channels increasing a size of the cooling channel formed within the tip portion.

6. The method of claim 1, wherein the first sheet and the at least one additional sheet are arranged and disposed to form a near-net shape of the tip portion.

7. The method of claim 1, wherein the article is a turbine bucket.

8. A method of forming an article, the method comprising:
forming a first pre-sintered preform (PSP) sheet, the first PSP sheet having a channel formed therein and extending completely therethrough;
forming at least one additional PSP sheet;
positioning the first PSP sheet over a first end of a body;
positioning the at least one additional PSP sheet over the first PSP sheet; and
securing the first PSP sheet and the at least one additional PSP sheet to the first end of the body to form a tip portion of the article, the channel in the first PSP sheet forming a cooling channel within the tip portion;
wherein the body forms a fluid tight bottom of the cooling channel; and
wherein the at least one additional sheet of material forms a fluid tight top of the cooling channel.

9. A method of forming an article, the method comprising:
forming a first sheet of material, the first sheet of material having a channel formed therein, the channel extending completely through the first sheet;
forming at least one additional sheet of material;
positioning the first sheet of material over a first end of a body;
positioning the at least one additional sheet of material over the first sheet of material; and
securing the first sheet of material and the at least one additional sheet of material to the first end of the body to form a tip portion of the article, the channel in the first sheet forming a cooling channel within the tip portion;
wherein the body forms a fluid tight bottom of the cooling channel.

10. The method of claim 9, further comprising at least one body aperture extending from the first end of the body to an inner region of the body, the at least one body aperture being aligned with the channel in the first sheet to provide fluid communication between the inner region and the cooling channel.

11. The method of claim 9, wherein the at least one additional sheet of material forms a fluid tight top of the cooling channel.

12. The method of claim 11, further comprising at least one additional sheet aperture extending through the at least one additional sheet of material, the at least one additional sheet aperture being aligned with the channel in the first sheet to provide a fluid outlet from the cooling channel to an outer region.

* * * * *